United States Patent [19]
Svanstrom

[11] 3,918,331
[45] Nov. 11, 1975

[54] LATHES
[75] Inventor: Sven-Erik Svanstrom, Vasteras, Sweden
[73] Assignee: SMT Machine Company AB, Vasteras, Sweden
[22] Filed: June 3, 1974
[21] Appl. No.: 476,142

[30] Foreign Application Priority Data
June 6, 1973 Sweden............................ 73079477

[52] U.S. Cl........................................ 82/2 R; 29/44
[51] Int. Cl.² ........................................... B23B 3/18
[58] Field of Search ............ 82/2 R, 3, 36 A; 29/39, 29/44

[56] References Cited
UNITED STATES PATENTS
1,056,332  3/1913  Hartness et al. .......................... 82/3
3,162,926  12/1964  Schwendenwein...................... 29/44
3,459,076  8/1969  Kummer .................................. 29/44

Primary Examiner—Leonidas Vlachos
Attorney, Agent, or Firm—Karl W. Flocks

[57] ABSTRACT

In a preferably automatic lathe having a horizontal spindle and turret, the spindle is arranged in a spindle headstock which is rectilinearly movable in a direction perpendicular to the center line of the spindle, the turret being rectilinearly movable in a direction perpendicular to the direction of movement of the spindle headstock. Furthermore, the axis of rotation of the turret is perpendicular to the center line of the spindle and at least substantially parallel to the direction of movement of the spindle headstock, and the turret is adapted to hold tools for internal as well as external machining operations.

3 Claims, 3 Drawing Figures

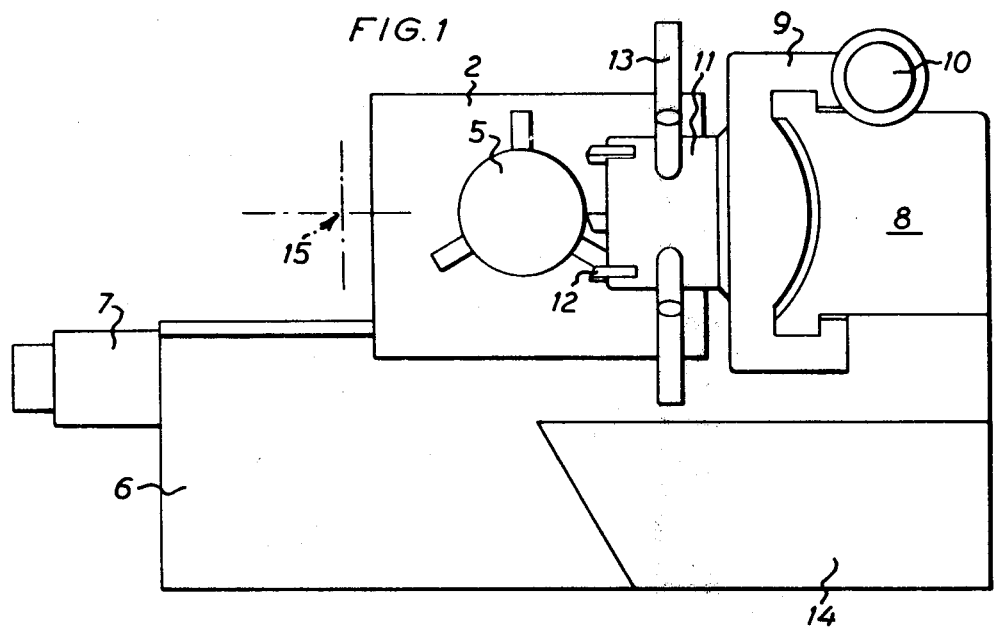
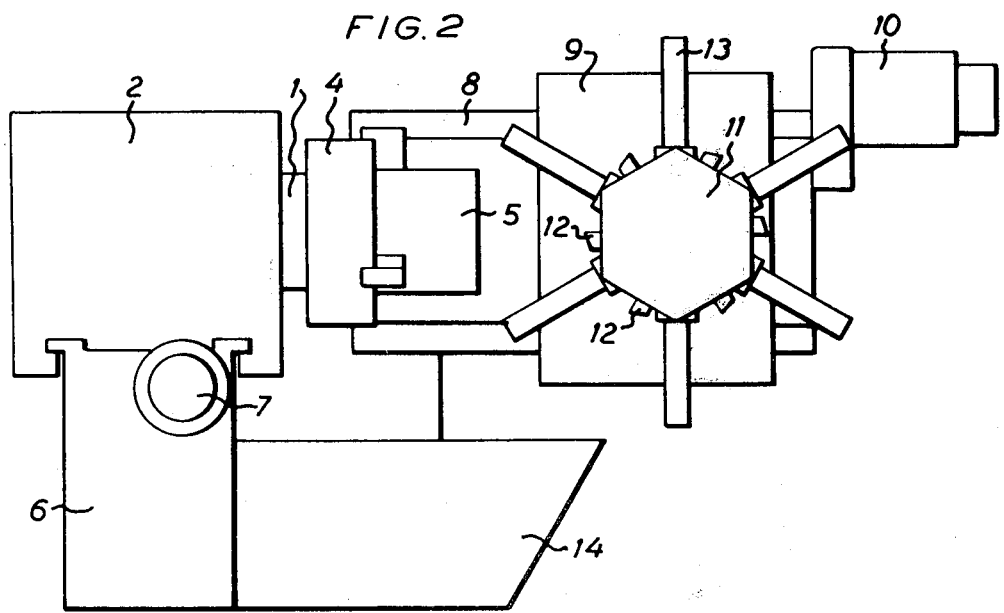

LATHES

The present invention relates to a lathe having a horizontal spindle and turret, and preferably to an automatic lathe in which the workpieces are clamped to the spindle by means of a chuck or fixture.

In the construction of automatic lathes, one aims int. al. at facilitating the work of the operator when changing workpieces, to obtain satisfactory discharge of chips from the lathe and to make possible a sufficient tooling for complicated workpieces to be machined externally as well as internally. All these demands are satisfied by the lathe according to the present invention, wherein the spindle is arranged in a spindle headstock, rectilinearly movable in a direction perpendicular to the centre line of said spindle, the turret is rectilinearly movable in a direction perpendicular to the direction of movement of said spindle headstock, the axis of rotation of said turret is perpendicular to the centre line of the spindle and at least substantially parallel to the direction of movement of the spindle headstock, and the turret is adapted to hold tools for internal as well as external machining operations.

In the lathe according to this invention, the work spindle with the workpiece clamped thereto may take such a position after completed machining that the workpiece can be manually changed with little effort or a mechanism intended for such a changing operation can be given a very simple design, without affecting or encroaching upon the range of work of the machine.

An embodiment of the invention will be described in greater detail hereinbelow and with reference to the accompanying drawings, in which:

FIGS. 1 and 2 show the lathe in side views taken at right angles to each other;

Figure 3:
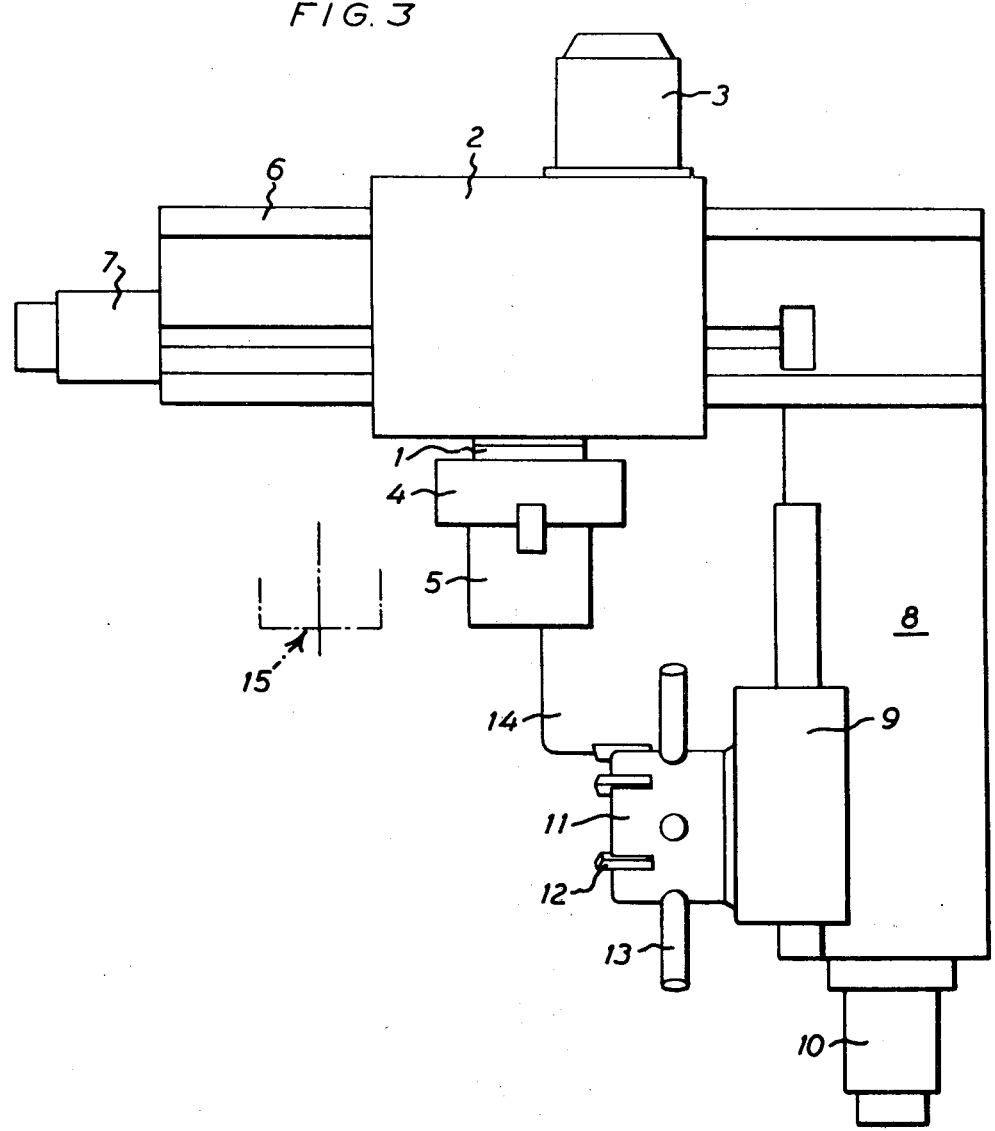
FIG. 3 shows the lathe, as viewed from above.

1 designates the work spindle of the lathe. It is arranged to be driven by the drive 3 disposed at the spindle headstock 2 (cf. FIG. 3). The spindle 1 is provided with a chuck 4 by which the workpiece 5 can be clamped to the spindle.

The spindle headstock 2 is rectilinearly movable in a direction perpendicular to the centre line of the spindle 1, said rectilinear movement being horizontal or almost horizontal. The spindle headstock 2 is disposed on the bed 6 and moved along said bed by means of the driving means 7.

In conjunction with the bed 6, there is provided another bed 8 whose straight guides are parallel to the centre line of the spindle 1. Said bed 8 supports a slide 9 which is movable, by the driving means 10, in parallel with the centre line of the spindle 1. On the slide 9 is disposed the tool-post, comprising a turret 11 which can be tooled with shank tools 12 for substantially external machining as well as round broaches 13 for internal machining. The internal machining tools 13 are disposed in a star fashion in a plane nearest to the straight guides of the slide 9, while the external machining tools 12 are disposed in the end face of the turret 11. Said tools 12 may have their shanks oriented in the radial as well as longitudinal direction of the turret 11. The turret 11 is so designed as to provide considerable possibilities of multiple tooling for both internal and external machining. This can be achieved without giving the turret a particularly large diameter.

By arranging tools, slides and guides in the above-mentioned fashion, these parts do not prevent the chips from falling freely down from the cutting region into the chip tray 14 or some conveyor means.

After completed machining, the spindle headstock is suitably moved automatically to its outer position 15 where the workpiece 5 can be changed unimpededly, either manually or automatically.

The invention is not restricted to the embodiment described above and shown in the drawings but may be modified within the spirit and scope of the appended claims.

What I claim and desire to secure by Letters Patent is:

1. A lathe having a spindle and a turret wherein said spindle is positioned horizontally and arranged in a spindle headstock and is rectilinearly movable in a direction perpendicular to the center line of said spindle; said turret having an axis of rotation perpendicular to the center line of said spindle and at least substantially parallel to the direction of movement of said spindle headstock; said spindle headstock being movable in a horizontally rectilinearly direction; said turret being rectilinearly movable, with said turret being horizontally rectilinearly movable in the direction perpendicular to the horizontal direction of movement of said spindle headstock, and axis of rotation of said turret being horizontally orientated; said spindle headstock being horizontally rectilinearly movable between an operating position whereby a workpiece at said spindle cooperates with tools at said turret arranged for internal as well as external machining operations; a releasing position of said spindle entirely by the side of said turret; said spindle headstock and said turret being so horizontally rectilinearly movable along guides at an at least substantially L-shaped support that said spindle at least in a releasing position is at a free space between stems of said L-shaped support.

2. A lathe as claimed in claim 1, wherein tools for internal machining are located inside the outer face of said turret.

3. A lathe as claimed in claim 1, wherein tools for internal machining are offset in the axial direction of said turret in relation to external machining tools, the internal machining tools being located further inward from the outer edge of said turret than the external machining tools.

* * * * *